United States Patent [19]

Witwer et al.

[11] Patent Number: 4,566,180
[45] Date of Patent: Jan. 28, 1986

[54] METHOD AND APPARATUS FOR PLACING COILS AND INTERMEDIATE INSULATORS IN CORES

[75] Inventors: Keith A. Witwer, Fort Wayne; Robert G. Walker, Ossian, both of Ind.

[73] Assignee: Industra Products, Inc., Fort Wayne, Ind.

[21] Appl. No.: 429,470

[22] Filed: Sep. 30, 1982

[51] Int. Cl.[4] ............... H02K 15/00; B23P 19/00
[52] U.S. Cl. .................. 29/596; 29/606; 29/734
[58] Field of Search .......... 29/596, 606, 732, 734, 29/736; 310/215

[56] References Cited

U.S. PATENT DOCUMENTS

| | | | |
|---|---|---|---|
| 3,579,791 | 5/1971 | Arnold | 29/606 |
| 3,672,039 | 6/1972 | Arnold | 29/596 |
| 3,885,288 | 5/1975 | Lund | 29/606 |
| 4,090,290 | 5/1978 | Clark | 29/596 |
| 4,455,743 | 6/1984 | Witwer et al. | 29/734 |

FOREIGN PATENT DOCUMENTS

| | | |
|---|---|---|
| 109133 | 10/1974 | Fed. Rep. of Germany . |
| 558243 | 6/1978 | Japan . |
| 54-144903 | 7/1978 | Japan . |
| 1515477 | 10/1976 | United Kingdom . |
| 2045650 | 3/1980 | United Kingdom . |

*Primary Examiner*—Mark Rosenbaum
*Assistant Examiner*—P. W. Echols
*Attorney, Agent, or Firm*—Albert L. Jeffers; Anthony Niewyk

[57] ABSTRACT

A coil placing machine having an improved operating sequence for positioning prewound coils and coil separating insulators in certain core slots is disclosed. A portion of each insulator is supported obliquely to the core axis and then both insulators and coils are moved toward the core, coil movement is interrupted while the insulators continue to move into their ultimate position within the core and thereafter coil movement is resumed to complete the coil and insulator placing operation. In the preferred aparatus a conventional coil stripper and insulation inserting gauge and blade alignment tool are separately actuated to pass into the core so that the axial separation between the stripper and tool is at first constant and then increases and finally decreases as the coil and insulator insertion progresses.

23 Claims, 7 Drawing Figures

METHOD AND APPARATUS FOR PLACING COILS AND INTERMEDIATE INSULATORS IN CORES

BACKGROUND OF THE DISCLOSURE

The present invention relates generally to the insertion of prewound coils and insulators in magnetic cores such as dynamoelectric machine stator cores. More particularly the present invention relates to a method and apparatus for placing coils and intermediate insulators in cores in which some coils are already positioned.

A number of machines have been devised for inserting prewound coils as well as, optionally, insulating wedges into statorcores. Illustrative of such machines are the Hill U.S. Pat. No. 3,324,536 and Walker et al, U.S. Pat. No. 3,402,462. Coil placing machines of this type typically include a plurality of generally parallel extending finger elements for supporting coils and a magnetic core into which the coils are to be placed along with a plurality of wedge guides adjacent portions of the finger elements for engaging the magnetic core. A stripper is reciprocable along the finger elements to engage and move the coils into the magnetic core and insulating wedge push rods are reciprocable along the wedge guides to engage and force insulating wedges into the core slots radially inwardly of the coils.

While the placement of the insulating wedges which lie radially inwardly of the windings by the same machine which places those windings in the core slots is well established, the machine placement of so called phase insulators which function to separate one winding from another within the dynamoelectric machine stator is for several reasons substantially more difficult to achieve. Typically such phase insulators will include end turn insulating sheets joined by leg portions intended to lie in the core slots intermediate the windings. Such phase insulators may for example be disposed intermediate the main and start windings of a single phase induction motor or between the several phase windings of a polyphase motor. Patents illustrating various approaches to the machine insertion of phase insulators include Clark, U.S. Pat. No. 4,090,290; Urick et al, U.S. Pat. No. 4,276,689; and Miller et al, U.S. Pat. No. 4,335,325. These patented schemes have one or more of the following drawbacks: not being readily compatible with coil placing machines of the type illustrated in the above-referenced two patents or with more complex multiple process machines employing such coil placing devices as an integral part thereof; requiring a guide element to be positioned by the operator in the coil placer's tooling; requiring phase insulators having excessive leg length so that the end turn insulating portion of the phase insulator may be separated slightly from the stator at one or both ends thereof; requiring a separate phase insulator inserting step; the occasional tearing of an insulator; the occasional trapping of a portion of the insulator between the coil placing tooling and the stator core; the frequent failure of the leg portion of the phase insulator to adequately separate windings within a slot; and the inadequate reduction in overall dynamoelectric machine stator fabricating time.

Frequently, coil placing machines of the above-referenced type form a part only of a more complex coil winding and placing device as illustrated for example by U.S. Pat. Nos. 3,625,261 and 3,828,830 both to Hill et al as well as U.S. Pat. No. 4,455,743 issued June 26, 1984, in the name of Witwer, et al. While the first commerical embodiment of the present invention is presently contemplated as being part of a somewhat simplified version of the last mentioned Witwer, et al machine, the principles and techniques of the present invention are applicable to a wide variety of coil placing devices of the types referred to above as well as others. Reference may be had to any of the aforementioned patents for details of the machine operation generally.

SUMMARY OF THE INVENTION

Among the several objects of the present invention may be noted the overall reduction in dynamoelectric machine assembly time; the provision of an improved coil and intermediate insulator inserting sequence; the provision of insulators intermediate coils in dynamoelectric machine stator cores more dimensionally suited to provide their insulating function; and the elimination of one or more of the above noted prior art deficiencies. These as well as other objects and advantageous features of the present invention will be in part apparent and in part pointed out hereinafter.

In general, insulating material is positioned within magnetic core slots radially outwardly of at least some of the coils being positioned in those slots by initially moving both the insulating material and the at least some coils toward the core, interrupting coil movement while continuing to move the insulating material into the core slots and thereafter resuming coil movement to complete placing of the coils.

Also in general and in one form of the invention windings are positioned over the finger elements of a coil placing device with side turn portions thereof extending between certain adjacent finger elements and between corresponding adjacent insulating wedge guides and thereafter phase insulators are similarly positioned with leg portions thereof extending between selected adjacent finger elements and between corresponding adjacent wedge guides. A magnetic core is then positioned on the finger elements and the phase insulators and windings thereupon placed within the core.

Still further in general and in one form of the invention a coil placing machine having a movable coil urging device for positioning the coils in stator core slots is provided with a further movable arrangement which passes ahead of the coil urging means through a stator core to position insulators in that core. This further movable member includes a frustoconical portion for supporting leading insulator portions obliquely to the direction of motion of the coil urging means and also includes a portion for engaging an intermediate insulator region radially outwardly of the leading portion. Desirably the intermediate insulator region may be somewhat wider than the core slot and be precreased or folded for ease of positioning in the slot and so that after positioning in the slot the portion expands to span the slot.

BRIEF DESCRIPTION OF THE DRAWINGS

Corresponding reference characters indicate corresponding parts throughout the several views of the drawing.

The exemplifications set out herein illustrate a preferred embodiment of the invention in one form thereof and such exemplifications are not to be construed as limiting in any manner the scope of the disclosure or the scope of the invention.

DETAILED DESCRIPTION OF THE PREFERRED EMBODIMENT

Figures 1, 4:
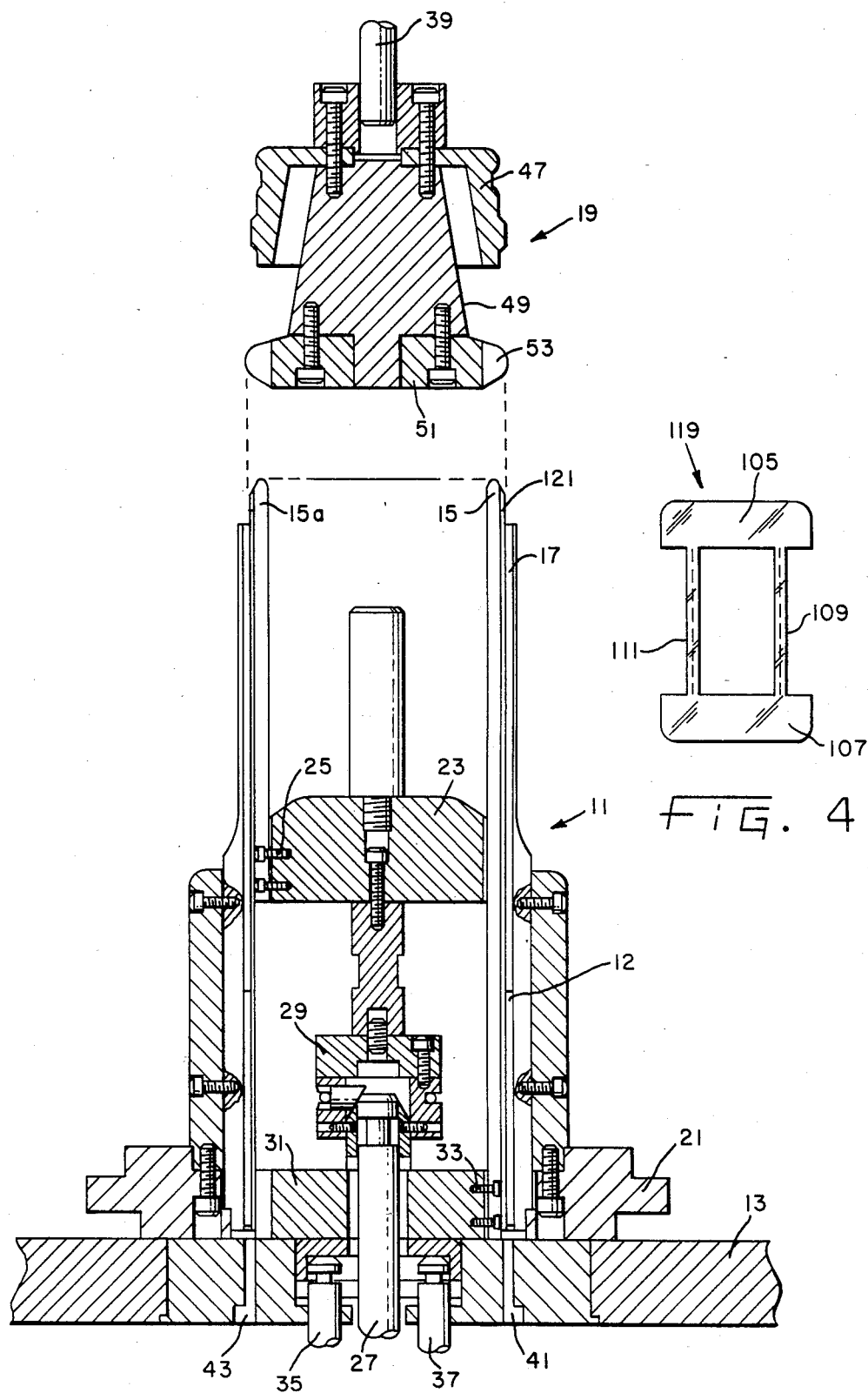
FIG. 1 is a side elevational view in section of the tooling of a coil placing machine in one form of the invention.
FIG. 4 is a plan view of one type phase or end turn insulator suitable for placement according to the techniques of the present invention.
Figure 2:
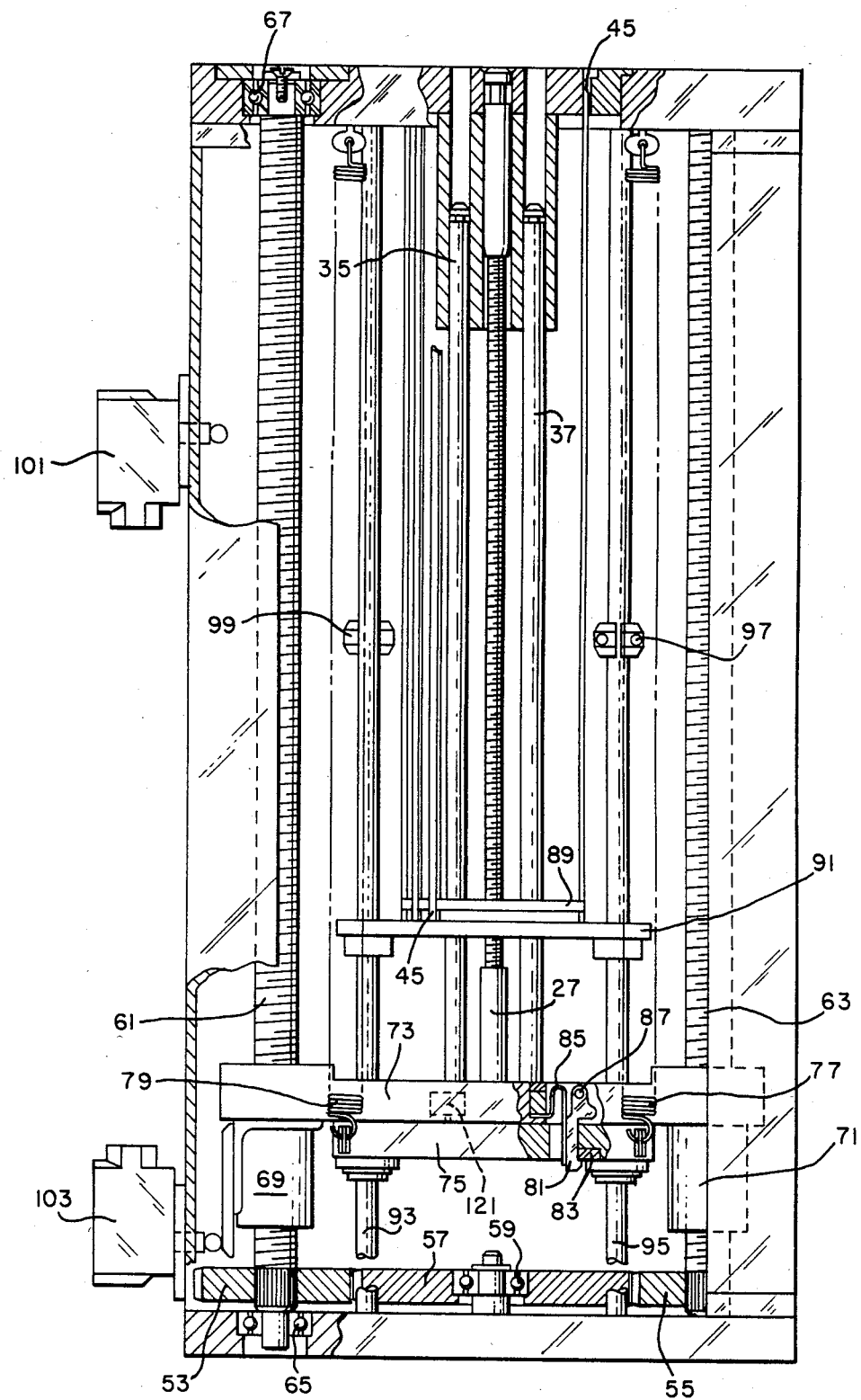
FIG. 2 is a side elevation view in section illustrating the mechanism for actuating the tooling of FIG. 1.

Referring first to FIG. 1 the coil placer tooling 11 may for example be supported on a rotatable turntable 13 which moves tooling 11 between a position where coils are wound and located between pairs of blades or finger elements such as 15 and between corresponding wedge guides such as 17 and a location where preformed wedges 12 are positioned between certain pairs of the wedge guides 17 and finally to a location in axial alignment with the insulation positioning member 19 as well as the drive mechanism of FIG. 2. The upper tooling 11 may be rotatable under control of a drive gear 21 for receiving more than one coil or winding and will typically include, in addition to the finger elements such as 15 and wedge guides such as 17, a stripper 23 which may as illustrated in the Donovan U.S. Pat. No. 3,689,976 have certain alternate ones of the blades or finger elements 15a attached thereto for movement therewith as by screws such as 25, or stripper 23 may be movable relative to all of the blades such as 15. In either case the function of stripper 23 is to engage the prewound coils leading them through a stator core and urging side turn portions of those coils into corresponding slots of that core. Stripper 23 is actuated or controlled by the stripper drive rod 27 and coupled thereto by the disconnect coupling 29. The upper tooling 11 additionally includes an axially movable blade support member 31 which may support all or as illustrated only certain alternate ones of the blades such as 15 which would be fastened thereto by bolts or screws such as 33. The blade support member 31 may be moved upwardly as viewed under the urging of the blade drive rods 35 and 37 which may be decouplably engaged with the blade support member 31. The drive rods 27, 35 and 37 may be lowered from the position illustrated since they form a part of the structure illustrated in FIG. 2 and this lowering allows the turntable 13 to rotate, moving the upper tooling 11 while the structure of FIG. 2 remains in a fixed position along with the insulation positioning element 19 which is suspended from an upper fixture by a movable drive rod 39. Slots such as 41 and 43 are provided to allow the wedge push rods such as 45 of FIG. 2 to pass through the turntable engaging wedges previously positioned in the wedge guides 17 and forcing those wedges into position when the machine is actuated.

The insulation positioning member 19 includes, in addition to the actuating rod 39, a gauge tool portion 47 which aids in maintaining proper alignment with a magnetic core, a frustoconical portion 49 for supporting the lead end portions of phase insulators and a blade alignment portion 51 including fins such as 53 which extend between adjacent finger elements 15.

The drive arrangement or lower tooling portion of FIG. 2 includes a power driven drive gear 57 journaled at 59 and engaging a like pair of driven gears 53 and 55 fixed to respective threaded shafts 61 and 63 opposite ends of which are journaled as at 65 and 67. Threaded couplings 69 and 71 are fixed to drive plate 73 so that when the drive gear 57 is rotated, respective threaded shafts 61 and 63 rotate in response thereto moving the drive plate 73 up or down according to the sense of rotation of the drive gear 57.

The coil placing machine of the disclosed preferred embodiment is intended for vertical or nearly vertical attitude operation that is, with the blades or finger elements 15 extending upwardly however the modifications necessary for operation in other than a vertical attitude will become apparent when a full understanding of the disclosed embodiment is acquired. A second or trailing plate 75 for moving the blade actuating rods 35 and 37 upwardly during coil insertion and downwardly thereafter is suspended or biased upwardly by coil springs such as 77 and 79. The trailing plate 75 is also coupled to the drive plate 73 by latch 81 engaging abutment 83 on the plate 75 and biased by leaf spring 85 to pivot on pin 87 into engagement with the abutment 83. Thus the latch 81 fastens trailing plate 75 to the drive plate 73 for movement therewith so long as the latch 81 remains engaged with the abutment 83.

The several insulating wedge push rods 45 are fastened to a push rod support plate 89 around the periphery thereof with the entire wedge push rod assembly being moved upwardly as viewed in response to upward movement of the push rod drive plate 91. Any or all of the movable plates 73, 75 and 91 may be provided with a series of apertures or journals for receiving guide rods such as 93 and 95 to maintain the proper alignment of the various parts of the lower tooling of FIG. 2. The guide rods 93 or 95 may also receive collars such as 97 or 99 which clamp to their respective guide rods at any desired position therealong for adjustment purposes as will appear more clearly when machine operation is discussed. Briefly, collar 97 engages latch 81 as the pair of plates 73 and 75 move upwardly together decoupling plate 75 and allowing plate 73 to move upwardly while plate 75 remains in its decoupled location supported by the springs 77 and 79. Also adjustably located along the path of travel of the drive plate 73 are a pair of limit switches 101 and 103 for sensing arrival at selected locations of the drive plate 73.

FIG. 4 illustrates one type of phase insulator for stator core insertion according to the techniques of the present invention. The insulator of FIG. 4 is cut from a sheet of Mylar or other insulating material so as to have end turn insulating portions 105 and 107 connected together by relatively more narrow leg portions 109 and 111 with the latter designed to reside in the stator core slots while the end turn insulating portions 105 and 107 lie to either side of the stator core and in between end turn winding layers. Preliminary to the coil and insulator inserting process the legs 109 and 111 are preferably creased along a line about midway between their side edges both to aid the insertion process and so that when the leg portions are positioned in the stator core slots the crease expands somewhat so that in cross section that leg turn portion assumes a V-shape to completely span the stator core slot.

Figure 3A:
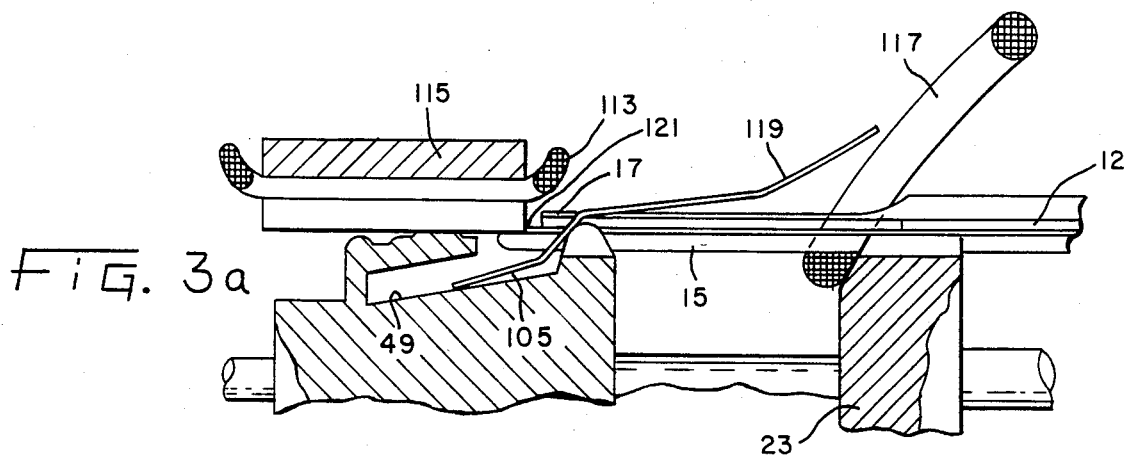
FIGS. 3a, 3b, 3c and 3d illustrate the sequential positions of the insulator and coil positioning elements of FIG. 1.
Figure 3B:
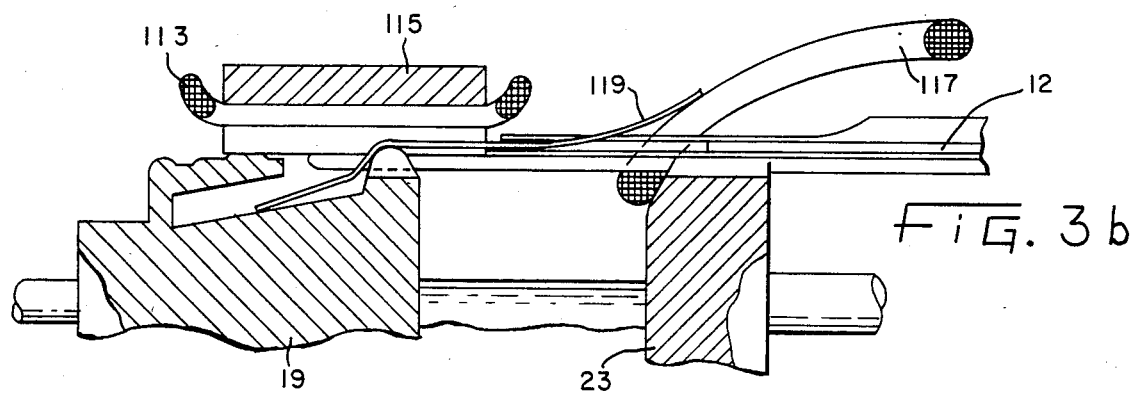
Figure 3C:
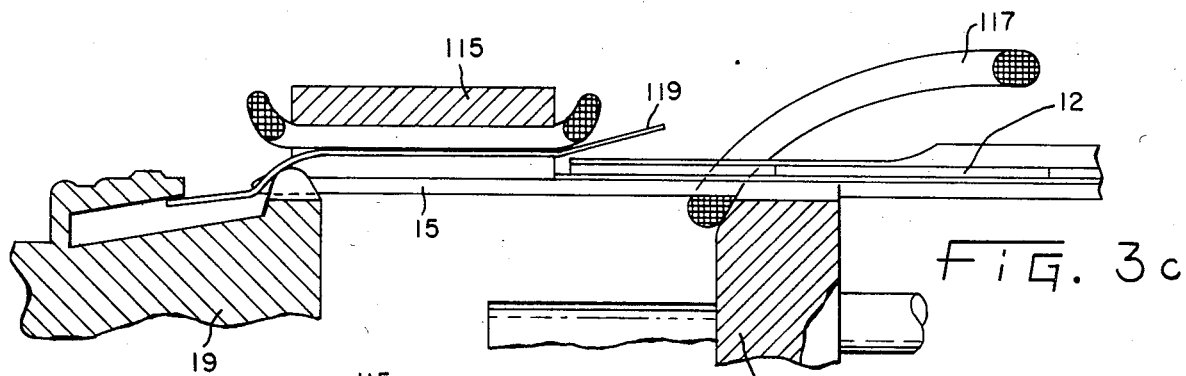
Figure 3D:
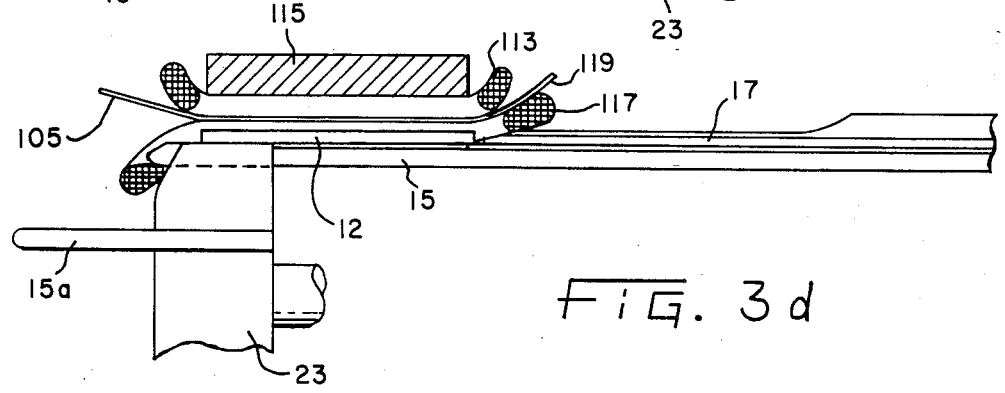

In operation then the following sequence of events might take place at a coil placing station. To have a specific example assume that a two pole induction motor is being fabricated and that at a prior station or otherwise in the assembly process the stator core has had slot lining cuffed insulators placed therein or the core slots otherwise insulated as by dipping or coating with a resinous material. A main or running winding 113 has also previously been positioned in the slotted stator core 115. A start or auxiliary winding 117 is appropriately positioned between adjacent pairs of the blades or fingers 15 and 15a between corresponding adjacent pairs of wedge guides 17 as illustrated in FIG. 3a. Stator core 115 is then axially aligned or positioned between the insulation positioning element 19 and the upper tooling 11 whereupon a hydraulic cylinder is actuated to lower by way of drive rod 39 the insulation positioning element 19 passing that element through the bore of the stator core and into engagement with the upper tooling 11. The insulation positioning element is lowered to a position where the blade alignment tool 51 is beneath the upper ends of the wedge guides 17 approximately in the position illustrated in FIG. 3a but with sufficient clearance so that the phase insulator 119 may be draped over the blades 15 with the leading end turn insulating portion 105 supported on the obliquely inclined frustonconical portion 49. Stator core 115 is then lowered axially so as to rest on the upper end 121 of the wedge guide 17 with these several elements now assuming the relative positions illustrated in FIG. 3a. A drive motor is now actuated causing the drive gear 57 to rotate. The entirety of the blades 15 and 15a, the stripper 23 and the insulation positioning element 19 move together as illustrated in the transition between FIGS. 3a and 3b. This results in the blades 15 and 15a being passed through the stator core 115, insulator 119 being partially inserted in stator core 115 and the coils 117 being moved upwardly toward stator core 115. When latch 81 of FIG. 2 reaches the collar 97, trailing plate 75 is uncoupled from the drive plate 73 halting movement of alternate ones of the blades 15. A limit switch 121 senses separation of the plates 75 and 73 and actuates the cylinder controlling the drive rod 39 and the insulation positioning element 19 continues its upward movement as illustrated in the transition between FIGS. 3b and 3c to complete the placement of the phase insulators 119. Once the insulation positioning element 19 has passed through the stator core 115 the stripper drive rod 27 will become engaged in the disconnect coupling 29 and resume the upward movement of stripper 23 so that the stripper passes through stator core 115 completing the placement of coils 117 in the stator core as illustrated in the transition between FIGS. 3c and 3d. When plate 73 engages limit switch 101 this upward movement of the stripper is stopped and the drive gear 57 may be reversed to first lower plates 91 and 73 withdrawing the stripper from the stator and wedge push rods from the upper tooling and eventually engaging also plate 75 to withdraw the blades 15 from the stator back to the position illustrated in FIG. 3a. At this time the stator may be removed from the blades 15 and the process repeated on another stator core. The process may also be carried out substantially as described but with the blades 15a, which were illustrated as attached to stripper 23, also being attached to the movable finger support 31 as were the blades 15. Also, the interruption of stripper movement by lost motion coupling 29 while completion of the inserting of the phase insulators was being accomplished could also be achieved by a limit switch for temporarily interrupting the operation of the motor driving gear 57 so that upward motion of the stripper 23 and its attached blades would be temporarily halted while the cylinder actuating rod 39 remains energized. A further limit switch (not shown) could be used to reenergize motor driving gear 57 to resume upward movement of stripper 23 after the insulation positioning element 19 had passed through stator core 115 as explained hereinabove.

From the foregoing it is now apparent that a novel coil placing device as well as a novel system for positioning coils and insulators in dynamoelectric machine stator cores has been disclosed meeting the objects and advantageous features set out herein before as well as others and that modifications as to the precise configurations, shapes and details may be made by those having ordinary skill in the art without departing from the spirit of the invention or the scope thereof as set out by the claims which follow.

What is claimed is:

1. In a coil placing machine for placing prewound coils in selected slots of a slotted dynamoelectric machine stator core the improved method of positioning insulating material within the core slots radially outwardly of at least some of the coils comprising the steps of:
   initially moving both the insulating material and said at least some of the coils toward the core;
   interrupting coil movement while continuing to move the insulating material into the core; and
   resuming coil movement after insulating material placement has been accomplished to complete placing of the coils.

2. In the placing of prewound coils and insulators in selected slots of a slotted dynamoelectric machine core by generally axial movement of the insulators and coils relative to the core and with the insulators preceeding the coils, the improvement wherein coil movement is interrupted while insulation movement continues to completion and thereafter coil movement is resumed and completed.

3. In a coil placing machine for placing prewound coils in selected slots of a slotted dynamoelectric machine stator core having means for supporting the prewound coils in proper alignment with the core for insertion and means movable along the supporting means to urge the prewound coils into the selected slots, the improvement comprising further means movable along the supporting means ahead of the coil urging means for urging insulators into certain of the slots, the axial separation between the two movable means being first constant, then increasing and finally decreasing as the coil and insulation insertion progresses.

4. The improvement of claim 3 wherein the insulator urging means comprises a frustoconical portion for supporting a leading insulator portion oblique to the direction of insulator urging means motion and a portion engaging an intermediate insulator region radially outwardly of the leading portion.

5. In a coil placing machine having a plurality of generally parallel extending finger elements for supporting coils and a magnetic core into which the coils are to be placed, a plurality of wedge guides adjacent portions of the finger elements for engaging the magnetic core, and a stripper reciprocable along the finger elements to engage and move the coils into the magnetic core, an improved method of placing coils and phase insulators in selected slots of the core comprising the step of:
   positioning coils over the finger elements with side turn portions thereof extending between certain adjacent finger elements and between corresponding adjacent wedge guides;

positioning phase insulators over the finger elements with leg portions thereof extending between selected adjacent finger elements and between corresponding adjacent wedge guides and completely below the tops of said wedge guides;

positioning a magnetic core on the finger elements; and placing the positioned phase insulators and coils in the core.

6. The method of claim 5 wherein the step of placing includes initially moving both insulators and windings toward the core, interrupting coil movement while continuing to move the insulators into the core, and resuming coil movement after the insulators have been placed in the core.

7. The method of claim 5 including the step of creasing insulator leg portions prior to positioning the phase insulators over the finger elements.

8. The method of claim 5 wherein the step of positioning the phase insulators includes supporting leading end portions of the insulators obliquely on the side of the finger elements opposite the wedge guides.

9. The method of claim 5 wherein the magnetic core is moved into a location aligned with but removed from the finger elements prior to the step of positioning phase insulators.

10. The method of claim 9 including the step of passing a blade alignment tool through the core subsequent to moving the core into alignment and prior to positioning the phase insulators.

11. The method of claim 10 wherein the placing step includes withdrawing the blade alignment tool back through the core to draw phase insulators into the core.

12. The method of claim 11 wherein movement of the stripper and withdrawal of the blade alignment tool are both initiated subsequent to the positioning of the magnetic core on the finger elements, the method including the further step of halting stripper movement while blade alignment tool withdrawal continues to completion.

13. The method of claim 12 including the further step of resuming stripper movement to complete placing of coils in the core and thereafter reversing the direction of stripper movement to return the stripper to an initial position withdrawn from the core.

14. In the coil placing machine for placing prewound coils in selected slots of a slotted dynamoelectric machine stator core having means for supporting the prewound coils in proper alignment with the core for insertion and means movable along the supporting means to urge the prewound coils into the selected slots, the improvement comprising further means movable along the supporting means ahead of and simultaneously with the coil urging means and having a frustoconical portion for supporting a leading insulator portion oblique to the direction of motion of the further movable means and including a portion for engaging an intermediate insulator region radially outwardly of the leading portion movement of the further means urging insulators into certain of the slots.

15. The improvement of claim 14 wherein the intermediate region engaging portion comprises a blade alignment tool for also aiding in maintaining proper alignment of the supporting means.

16. The improvement of claim 14 further comprising positioning means for positioning a stator core intermediate the means for supporting and movable means on one side and the further movable means on the other side, passing means for passing the further movable means through the stator core and into engagement with the supporting means, translating means for translating the positioning stator core axially into engagement with the supporting means, moving means for initiating movement of the movable means and the further movable means toward the stator core, interrupting means for interrupting motion of the movable means while the further moveable means continues to move through the stator core, movement reinitiating means for reinitiating movement of the movable means after the further movable means has passed back through the stator core with the movable means thereafter completing movement through the stator core and subsequent withdrawal therefrom.

17. The improvement of claim 16 wherein the interrupting means includes a sensor means responsive to the further movable means reaching a first position and the movement reinitiating means is a disconnect coupling responsive to the further movable means reaching a second position.

18. The improvement of claim 14 wherein the means for supporting includes a plurality of generally parallel extending finger elements alternate ones of adjacent pairs of which are affixed to the movable means for movement therewith and the remainder of which are affixed to and movable with an axially movable finger support further comprising a driven plate having a stripper drive shaft extending therefrom for engaging and moving the movable means in conjuction with motion of the driven plate, a trailing plate, a spring latch normally joining the trailing plate to the driven plate for movement therewith, means extending from the trailing plate for engaging and moving the finger support, and means adjustably positionable along the travel of the driven plate for tripping the spring latch thereby separating the trailing and driven plates and halting movement of the remainder of the finger elements while allowing continued movement of the alternate ones of the finger elements and the movable means.

19. The improvement of claim 18 further comprising a limit switch positioned beyond the adjustably positionable means for sensing the separation of the trailing and driven plates subsequent to the halting of the remainder of the finger elements.

20. The improvement of claim 19 further comprising means responsive to said limit switch to reverse the drive of the driven plate to withdraw the movable means from a stator core.

21. The improvement of claim 18 wherein the coil placing machine includes an arrangement for positioning insulating wedges in certain stator core slots including a plurality of generally parallel upstanding wedge push rods and a drive plate for moving the push rods in unison to position the insulating wedges, the driven plate engaging and moving the push rod drive plate prior to tripping the spring latch.

22. The improvement of claim 14 wherein the further movable means is separable from the movable means and supporting means to allow a stator core to be interposed therebetween, the further movable means to be passed through the stator core and into engagement with the supporting means, insulators to be positioned engaging the further movable means, and the stator core translated into engagement with the supporting means and further comprising means initiating movement of the movable means, further movable means, and supporting means all in a direction opposite the direction in which the further movable means was previously passed through the stator core.

23. The improvement of claim 22 further comprising means interrupting movement of the movable means while movement of the further movable means continues.

* * * * *